March 16, 1937.  J. W. ANDERSON  2,073,822
STEERING WHEEL
Filed Sept. 9, 1935
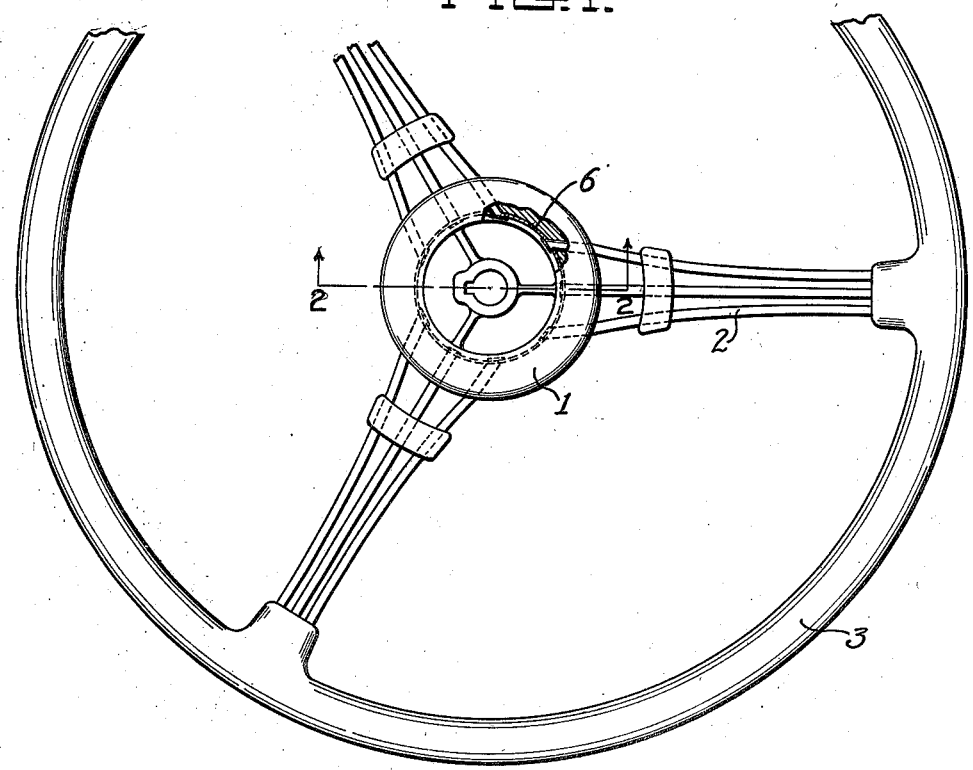
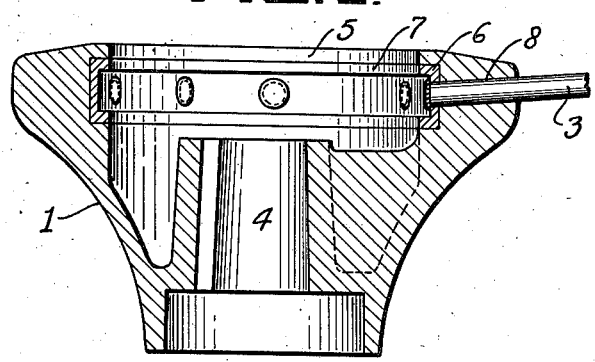
Inventor
John W. Anderson
By Owen & Owen
Attorneys.

Patented Mar. 16, 1937

2,073,822

UNITED STATES PATENT OFFICE 2,073,822

STEERING WHEEL

John W. Anderson, Portland, Ind., assignor to Sheller Manufacturing Corporation, Portland, Ind., a corporation of Indiana Application September 9, 1935, Serial No. 39,681

4 Claims. (Cl. 74—552)

This invention relates to steering wheels of the type particularly used in automobiles, and has primarily for its objects the provision of strong, durable and novel means for attaching the wire spoke ends to the hub members and the provision of a method of attaching same.

In wheels of this character, it is customary to make the hubs in two parts, a lower body part and an upper spoke clamping part secured to the body part by screws or the like. There are certain objections to this form of hub construction and manner of attaching the wire spoke ends thereto which it is the purpose of the present invention to overcome.

The invention is fully described in the following specification and a preferred embodiment thereof illustrated in the accompanying drawing, in which—

Figure 1 is a plan view of a steering wheel embodying my invention, with parts broken away, and Fig. 2 is an enlarged section on the line 2—2 in Fig. 1.

Referring to the drawing, 1 designates the hub, 2 the wire spoke members, and 3 the rim of a hand steering wheel.

The hub 1 is composed of a single piece of hard rigid material, preferably die cast metal, and is provided centrally with the steering post and key-receiving opening 4, the lower or bottom end of which is enlarged to receive the customary steering post column. The upper end of the hub at the top of the opening 4 is provided with an enlarged coaxially disposed socket 5 for receiving the control parts and mounting therefor customarily provided on steering wheel hubs.

The side wall of the socket 5 is cylindrical or substantially so, and set into an undercut annular recess 6 therein is a metal ring 7 preferably of steel, which is U-shape in cross-section with its channel facing inward, or, in other words, the ring is of internal channel form. This ring is preferably set in the hub during the forming thereof so it is firmly and rigidly secured therein and is substantially integral with the hub body.

When the hub, with the insert ring 7, has been formed, the portion thereof forming the side wall of the socket 5 is transversely drilled to provide spoke-receiving openings 8 to suit the number and position of the inner ends of the wire spoke members 3, with the ends thereof extending through the ring 7 and into its channel. In attaching the inner spoke ends to the hub, the wire or wires, or rod-like member or members, 3 thereof are inserted in respective openings 8 and then electrically welded, upset or otherwise firmly and rigidly anchored to the ring 7 within its channel, so that any burr formed on the spoke end by the welding or other upsetting will not interfere with the insertion of control parts or other mounting into the socket 5.

It is apparent that the invention not only provides a steering wheel hub of integral construction but also provides simple, strong and durable means for attaching the inner ends of the spoke members to the hub. Furthermore, the ring 7, in addition to serving as a rigid anchoring means for the spoke ends to which they may be welded, serves as a reinforcement for the hub.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. A steering wheel having a one-piece hub with a control-mount receiving socket in its top, a steel ring encompassing the socket in exposed position within its side wall, said side wall and ring having aligned spoke-receiving openings therein, and spoke wires inserted through said openings and integrally fixed at their inner ends to the ring.

2. A steering wheel having a one-piece hub with a control-mount receiving socket in its top, a metallic ring encompassing said socket and set into the side wall thereof, said ring being U-shape in cross-section to form an inwardly facing channel, and said side wall and ring having aligned spoke-receiving openings, and spoke wires inserted through said openings and upset at their inner ends within the ring channel.

3. A steering wheel having a one-piece hub of die casting metal with a control-mount receiving socket in its top, a steel ring encompassing said socket and set into its side wall flush therewith, said ring being U-shape in cross-section to form an inwardly facing channel, said wall and ring having aligned spoke-receiving openings, and steel spoke wires inserted through said openings and electrically welded to the ring within its channel.

4. A steering wheel having a one-piece hub with a control-mount receiving socket in its top, a metallic ring disposed in said socket and abutting outwardly against the side wall of the socket, said side wall and ring having aligned spoke-receiving openings therein, and spoke wires inserted through said openings and integrally fixed at their inner ends to the ring.

JOHN W. ANDERSON.